US010608888B2

United States Patent
Daniel et al.

(10) Patent No.: US 10,608,888 B2
(45) Date of Patent: Mar. 31, 2020

(54) RELATING AN OPERATOR TO A POWER SOURCE

(71) Applicant: Lincoln Global, Inc., Santa Fe Springs, CA (US)

(72) Inventors: Joseph A. Daniel, Sagamore Hills, OH (US); Todd E. Kooken, Solon, OH (US); Bruce J. Chantry, Solon, OH (US); William T. Matthews, Chesterland, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 165 days.

(21) Appl. No.: 15/849,829

(22) Filed: Dec. 21, 2017

(65) Prior Publication Data

US 2019/0199596 A1    Jun. 27, 2019

(51) Int. Cl.
*H04L 12/24* (2006.01)
*B23K 31/00* (2006.01)
(Continued)

(52) U.S. Cl.
CPC ............ *H04L 41/14* (2013.01); *B23K 9/0953* (2013.01); *B23K 9/0956* (2013.01);
(Continued)

(58) Field of Classification Search
CPC ......... H04L 41/14; H04L 67/12; H04L 67/18; H04L 67/22; B23K 9/0953; B23K 9/0956; B23K 9/1006; B23K 9/1087; B23K 9/173; B23K 9/32; B23K 9/322; B23K 31/006; H04B 5/0062; H04W 4/02
See application file for complete search history.

(56) References Cited

U.S. PATENT DOCUMENTS

| 7,523,069 B1 | 4/2009 | Friedl et al. |
| 2007/0080153 A1* | 4/2007 | Albrecht .................. B23K 9/10 219/130.01 |

(Continued)

FOREIGN PATENT DOCUMENTS

DE    10 2014 211 299 A1    12/2015

OTHER PUBLICATIONS

Miller; "Insight Core™ Cloud Weld Monitoring Solution"; https://www.millerwelds.com/products/insight/insight-core; Accessed Jun. 23, 2017; 4 Pages.
(Continued)

*Primary Examiner* — Nasser M Goodarzi
*Assistant Examiner* — Adil Ocak
(74) *Attorney, Agent, or Firm* — David J. Muzilla (57) ABSTRACT

Embodiments of systems and methods to relate a human operator to a welding power source are disclosed. One embodiment is a networked system having a server computer. The server computer is configured to receive first data including at least one of an identity or a location of a welding helmet within a welding environment, and a triggering status indicating a triggering of an arc detection sensor of the welding helmet due to initiation of a welding arc. The server computer is configured to receive second data including at least one of an identity or a location of a welding power source within the welding environment, and an activation status indicating an activation of the welding power source. The server computer is configured to match the welding power source to a human operator using the welding helmet based on at least the first data and the second data.

20 Claims, 5 Drawing Sheets

(51) Int. Cl.
  *H04W 4/02* (2018.01)
  *H04B 5/00* (2006.01)
  *B23K 9/10* (2006.01)
  *H04L 29/08* (2006.01)
  *B23K 9/32* (2006.01)
  *B23K 9/095* (2006.01)
  *B23K 9/173* (2006.01)

(52) U.S. Cl.
  CPC .......... *B23K 9/1006* (2013.01); *B23K 9/1087* (2013.01); *B23K 9/173* (2013.01); *B23K 9/32* (2013.01); *B23K 9/322* (2013.01); *B23K 31/006* (2013.01); *H04B 5/0062* (2013.01); *H04L 67/12* (2013.01); *H04L 67/18* (2013.01); *H04L 67/22* (2013.01); *H04W 4/02* (2013.01)

(56) References Cited

U.S. PATENT DOCUMENTS

| | | |
|---|---|---|
| 2013/0119036 A1 | 5/2013 | Daniel |
| 2013/0206740 A1 | 8/2013 | Pfeifer et al. |
| 2013/0291271 A1* | 11/2013 | Becker ................... G06F 3/005 2/8.2 |
| 2014/0263227 A1 | 9/2014 | Daniel et al. |
| 2015/0034618 A1 | 2/2015 | Langeder et al. |
| 2015/0088285 A1 | 3/2015 | Casner et al. |
| 2015/0375324 A1 | 12/2015 | Becker |
| 2016/0039053 A1 | 2/2016 | Becker et al. |
| 2016/0045971 A1 | 2/2016 | Holverson |
| 2016/0365004 A1 | 12/2016 | Matthews et al. |
| 2017/0050256 A1 | 2/2017 | Enyedy |
| 2017/0323584 A1 | 11/2017 | Daniel et al. |

OTHER PUBLICATIONS

Fronius International GmbH; "Weldcube: The New World of Documentation and Data Analysis;" https://www.fronius.com/en/welding-technology/our-expertise/technology/weldcube; Accessed Jun. 23, 2017; 3 Pages.

ESAB; "Weldcloud;" http://www.esabna.com/us/en/weldcloud/index.cfm; Accessed Jun. 23, 2017; 5 Pages.

Extended European Search Report from Corresponding Application No. 18215434.4; Dated Jun. 11, 2019; pp. 1-5.

* cited by examiner

FIG. 5

RELATING AN OPERATOR TO A POWER SOURCE

FIELD

Embodiments of the present invention relate to systems and methods associated with a welding environment. More specifically, embodiments of the present invention relate to systems and methods for relating human operators to welding power sources in a welding environment.

BACKGROUND

In a welding environment (e.g., in a factory environment where welding is performed), many welding power sources and welding helmets may be located at various locations within the welding environment. At any given time, some welding power sources within the welding environment may or may not be used. Similarly, at any given time, some welding helmets within the welding environment may or may not be used. Furthermore, a particular human operator may or may not be wearing a particular welding helmet and may or may not be using a particular welding power source during a welding operation within the welding environment. This can make it difficult for a manager of the welding environment (or other persons within the welding environment responsible for keeping the welding environment up and running) to determine which welding power source is being used by which operator. A more effective way of determining and tracking which operators are using which welding power sources at what times in a welding environment is desired.

SUMMARY

Embodiments of the present invention include systems and methods for relating human operators to welding power sources in a welding environment (e.g., a factory). A networked configuration of welding power sources, welding helmets, and server computers allow the welding power sources to be properly related to human operators using those welding power sources within a welding environment.

One embodiment includes a method of relating an operator to a welding power source in a welding environment. The method includes receiving first data associated with a welding helmet within a welding environment at one or more server computers in a networked system. The first data indicates at least one of an identity or a location of the welding helmet within the welding environment. The first data also indicates a triggering status indicating a triggering of an arc detection sensor associated with the welding helmet due to initiation of a welding arc within the welding environment. The method further includes receiving second data associated with a welding power source within the welding environment at the one or more server computers in the networked system. The second data indicates at least one of an identity or a location of the welding power source within the welding environment. The second data also indicates an activation status indicating an activation of the welding power source within the welding environment. The method also includes the one or more server computers in the networked system matching the welding power source to the welding helmet, and to an operator associated with the welding helmet. The matching is based on at least the first data and the second data and indicates that the welding power source is being operated by the operator wearing the welding helmet during a welding operation within the welding environment. The method can also include configuring the networked system as at least one of a local area network (LAN), a wide area network (WAN), or a cloud-based network. The method can further include associating the welding helmet, within the one or more server computers, as being assigned to the operator. The method can also include wirelessly transmitting the first data from the welding helmet via a communication device of the welding helmet to be received by the one or more server computers via the networked system. The method can further include transmitting the second data from the welding power source via a communication device of the welding power source to be received by the one or more server computers via the networked system. In one embodiment, the location and the identity of the welding helmet can be received at the one or more server computers, as part of the first data, from a sensor device co-located with (e.g., located near) the welding power source. The sensor device is configured to sense at least the identity of the welding helmet when the welding helmet is within communication range of the sensor device. In one embodiment, a radio frequency identification (RFID) tag of the welding helmet is read via an RFID reader co-located with (e.g., located near) the welding power source to extract at least the identity of the welding helmet. The method can also include the welding helmet reading a code on a badge worn by the operator, where the code identifies the operator. In one embodiment, the code can be read by a code reading device of the welding helmet and the code can be received at the one or more server computers in the networked system as part of the first data after the code is read by the welding helmet.

One embodiment includes a networked system for relating an operator to a welding power source in a welding environment. The system includes a plurality of welding power sources and a plurality of welding helmets within the welding environment. The system also includes at least one server computer. The at least one server computer is configured to receive first data associated with a welding helmet of the plurality of welding helmets within the welding environment. The first data indicates at least one of an identity or a location of the welding helmet within the welding environment. The first data also indicates a triggering status indicating a triggering of an arc detection sensor associated with the welding helmet due to an initiation of a welding arc within the welding environment. The at least one server computer is also configured to receive second data associated with a welding power source of the plurality of welding power sources within the welding environment. The second data indicates at least one of an identity or a location of the welding power source within the welding environment. The second data also indicates an activation status indicating an activation of the welding power source to initiate the welding arc within the welding environment. The at least one server computer is further configured to match the welding power source to the welding helmet, and to an operator associated with the welding helmet, based on at least the first data and the second data. A match indicates that the welding power source is being operated by the operator wearing the welding helmet during a welding operation within the welding environment. In one embodiment, the networked system is configured as at least one of a local area network (LAN), a wide area network (WAN), or a cloud-based network. In one embodiment, the at least one server computer is configured to store association data that associates the welding helmet as being assigned to the operator. In one embodiment, the at least one server computer is configured to access association data that associates the welding helmet as being assigned to the operator. In one embodiment, the welding power source includes a communication device configured to transmit the second data from the welding power source to be received by the at least one server computer via the networked system. The networked system can include a sensor device co-located with (e.g., located near) the welding power source. The sensor device is configured to sense at least the identity of the welding helmet when the welding helmet is within communication range of the sensor device. The sensor device is also configured to transmit at least the identity of the welding helmet and the location of the sensor device (as the location of the welding helmet) to be received by the at least one server computer via the networked system. In one embodiment, the welding helmet includes an RFID tag storing at least the identity of the welding helmet. The sensor device is configured to read at least the identity of the welding helmet from the RFID tag when the welding helmet is within communication range of the sensor device. In one embodiment, the welding helmet includes a communication device configured to wirelessly transmit the first data from the welding helmet to be received by the at least one server computer via the networked system. In one embodiment, the welding helmet includes a code reading device configured to read a code on a badge worn by the operator. The code identifies the operator and the code reading device is configured to provide the code to the communication device to be transmitted to the at least one server computer via the networked system as part of the first data. In one embodiment, the arc detection sensor includes an auto-darkening filter of the welding helmet and is configured to provide the triggering status to the communication device to be transmitted to the at least one server computer via the networked system as part of the first data.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Embodiments of systems and methods to identify particular operators that are actively using particular welding power sources in a welding environment are disclosed. In one embodiment, an identity and/or a location of a welding helmet within the welding environment, along with a triggering status of an arc detection sensor associated with the welding helmet, are received as first data at a server computer. An identity and/or a location of a welding power source within the welding environment, along with an activation status of the welding power source, are received as second data at the server computer. The server computer analyzes the first data and the second data to determine whether the welding power source is being operated by a particular operator wearing the welding helmet during a welding operation within the welding environment.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates a first embodiment of a networked system 100 including a welding environment having multiple welding helmets and multiple welding power sources.

Figure 1:
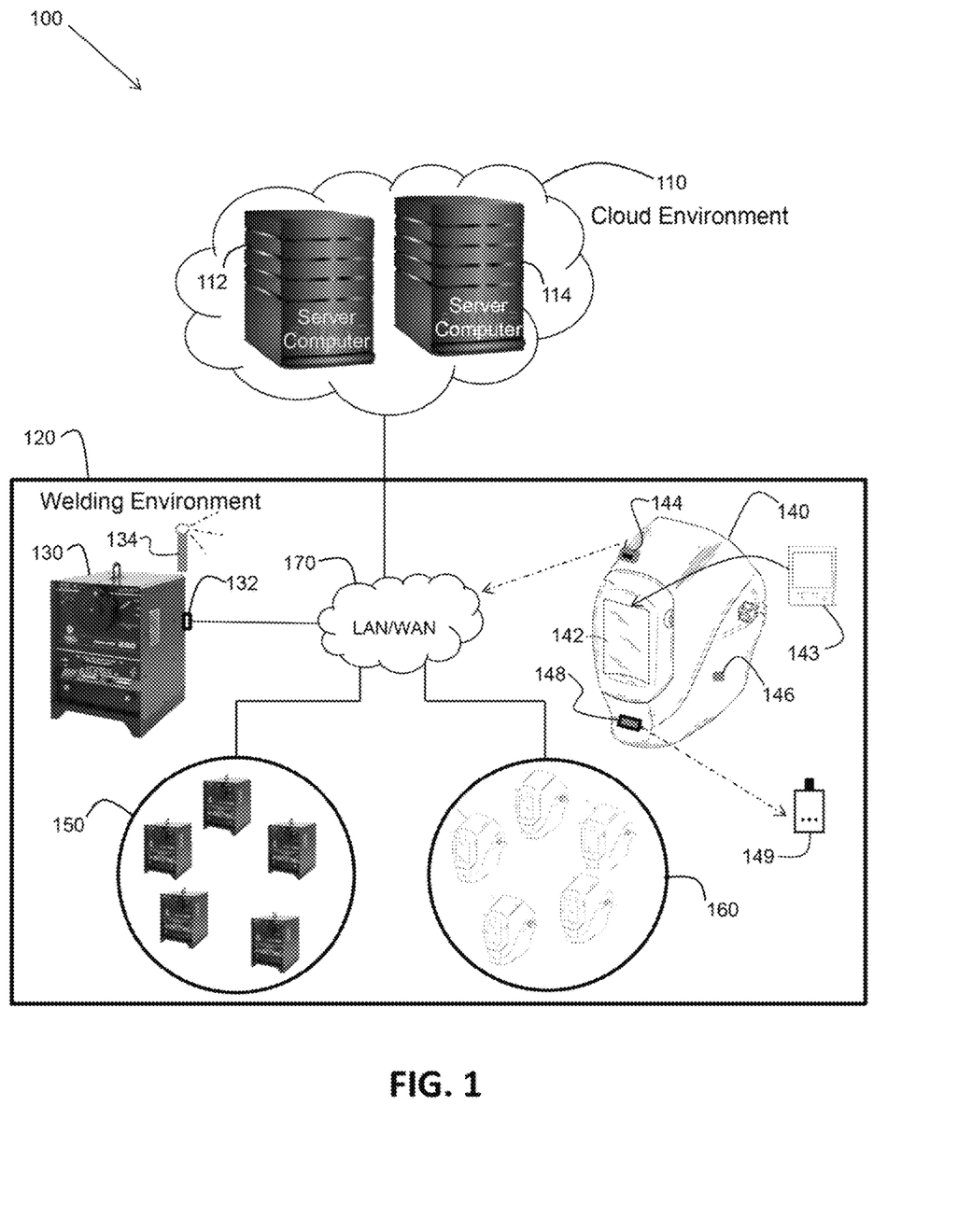
FIG. 1 illustrates a first embodiment of a networked system including a welding environment having multiple welding helmets and welding power sources.
Figure 4:
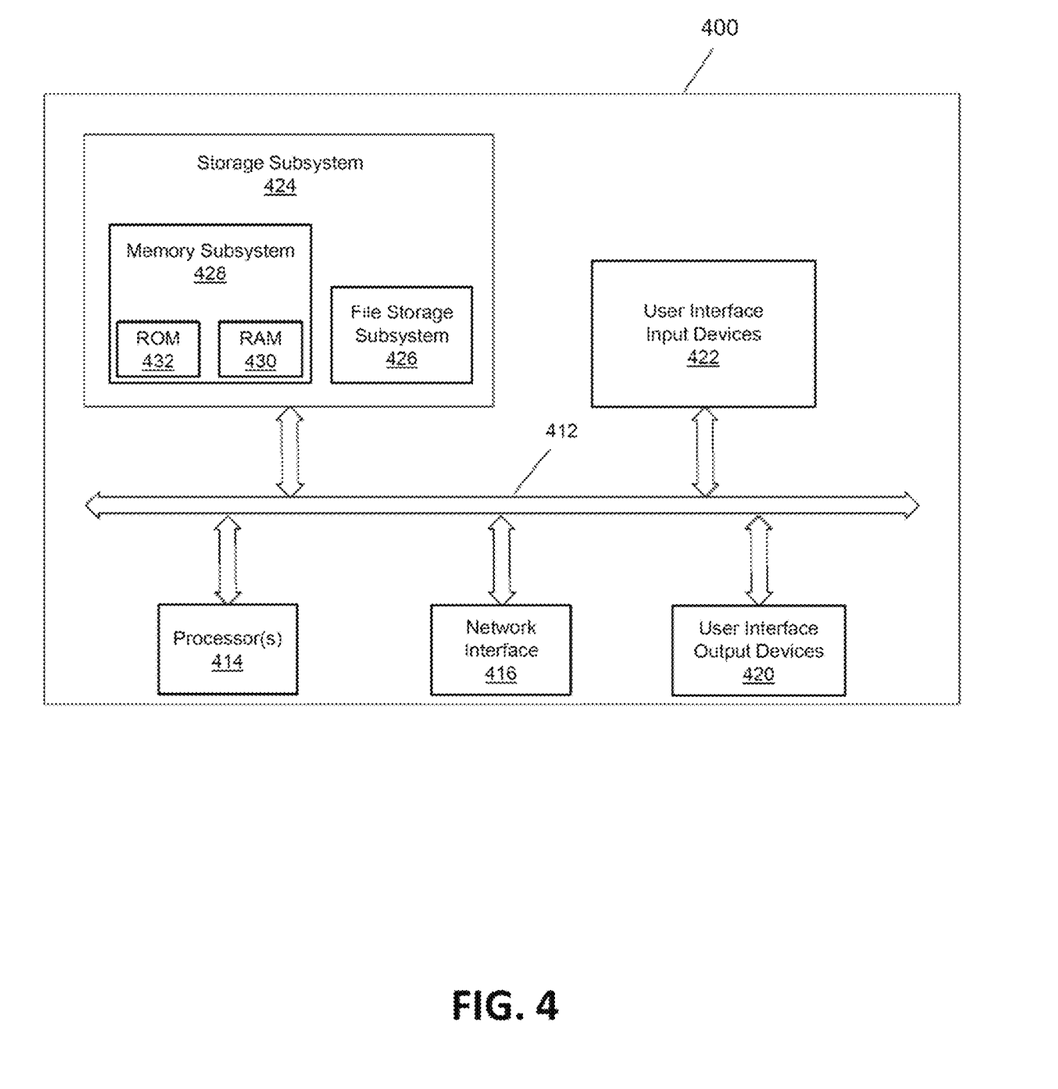
FIG. 4 illustrates one embodiment of an example server computer that may be used as the server computers in the networked system of FIG. 1 or in the networked system of FIG. 2.

Referring to FIG. 1, the networked system 100 includes a cloud environment 110 and a welding environment 120. The cloud environment 110 includes a first server computer 112 and a second server computer 114. For example, the server computers 112 and 114 may exist remotely from the welding environment 120 as part of a server farm and communicate with the welding environment via the internet. The server computers 112 and 114 are configured to receive data from the welding environment 120, process the data, and send other data back to the welding environment, in accordance with one embodiment. In accordance with other embodiments, one, three, or more server computers may exist in the cloud environment 100 which are configured to receive data from the welding environment 120 and send other data back to the welding environment. The server computers have at least one processor configured to execute computer-executable instructions to perform various functions that are described herein. FIG. 4 (discussed later herein) illustrates one embodiment of an example server computer that may be used as the server computers 112/114 in the networked system 100 of FIG. 1.

The welding environment 120 may exist, for example, within a factory or within a portion of a factory. In FIG. 1, the welding environment 120 includes a welding power source 130, a welding helmet 140, other welding power sources 150, other welding helmets 160, and a computer network 170 such as, for example, a local area network (LAN), a wide area network (WAN), or some combination thereof. The computer network 170 is configured to provide networked communications between the elements of the welding environment 120 (e.g., the welding power source 130, the welding helmet 140, the other welding power sources 150, and the other welding helmets 160) and the server computers in the cloud environment 110. It is assumed herein that the welding power sources are configured to be interfaced to, directly or indirectly, with other equipment for use during a welding operation. The other equipment may include, for example, welding wire feeders and welding guns or torches.

The welding power source 130 and each of the other welding power sources 150 are configured to communicate with the server computers 112/114 in the cloud environment 110 via the computer network 170. In one embodiment, each of the welding power sources includes a communication module 132 configured to communicate the information related to a respective welding power source to the server computers 112 and/or 114 in the cloud environment 110 as digital data via the computer network 170. The communicated information may include, for example, an identity and a location of a respective welding power source and an activation status, indicating an activation of the welding power source, within the welding environment 120, to initiate a welding arc (e.g., between a welding wire and a workpiece). In one embodiment, the activation status may be "active" or "inactive", for example. The "active" status indicates that the welding power source has been activated by a user to apply electrical power to a welding electrode such as, for example, a consumable source of welding wire (e.g., when an arc is initiated when an operator pulls a trigger on a welding gun). The communicated information may also include, for example, a welding mode, a welding voltage, a welding current, a welding duration, and/or a welding wire feed speed. The information, as communicated, may be in the form of digital data or analog data, in accordance with various embodiments. In one embodiment, the communication device 132 is a digital communication device such as, for example, a router. Communication may be wired (e.g. via copper, fiber optic) or wireless (e.g., via WiFi, Bluetooth®), in accordance with various embodiments.

In one embodiment, the welding helmet 140 includes a transparent spatter shield 142 and an auto-darkening filter (ADF) located behind the spatter shield 142 within the welding helmet 140 serving as an arc detection sensor 143. When an arc is initiated during a welding operation, the ADF 143 switches from a non-darkened state to a darkened state, in response to the bright light from the arc, to protect the eyes of the operator wearing the welding helmet 140. The ADF 143 is configured to generate a triggering status (e.g., a trigger signal) indicating that the ADF 143 has switched to the darkened state. In accordance with other embodiments, the arc detection sensor may take other forms other than an ADF. For example, the arc detection sensor may be a thresholded photo sensor configured to generate a signal that indicates that an arc has been struck nearby. Such photo sensors can be of the photovoltaic type or the photo-emissive type, for example. Such types include, for example, photoconductive cells, photo-junction devices, and photovoltaic cells. For purposes of simplifying the subsequent discussion herein, the ADF form of the arc detection sensor 143 will be used.

The welding helmet 140 also includes a communication device 144 configured to wirelessly communicate information to the computer network 170 to be received by the server computers 112/114 via the networked system 100. The triggering status generated by the ADF 143 is provided (e.g., via wired means) to the communication device 144, in accordance with one embodiment, such that the communication device 144 may transmit the triggering status to be received by the server computers 112/114 via the networked system 100. The communication device 144 is also configured to store and transmit an identity of the welding helmet 140 within the welding environment 120, in accordance with one embodiment. The identity of the welding helmet 140 may be stored elsewhere within the welding helmet 140, in accordance with other embodiments. The communication device 144 can also wirelessly communicate the identity of the welding helmet 140, along with the triggering status, to the computer network 170 to be received by the server computers 112/114 via the networked system 100. In accordance with one embodiment, the communication device 144 is a Bluetooth® device. In accordance with another embodiment, the communication device 144 is a WiFi device.

In one embodiment, the networked system 100 includes a sensor device 134 co-located with the welding power source 130. The sensor device 134 is configured to sense the identity of the welding helmet 140 when the welding helmet is within communication range of the sensor device 134. For example, in one embodiment, the welding helmet 140 includes an RFID tag 146 that stores the identity of the welding helmet 140. The RFID tag 146 may store other helmet-related information (e.g., helmet brand, helmet characteristics) as well, in accordance with various embodiments. The sensor device 134 is an RFID reader configured to read the identity of the welding helmet 140 from the RFID tag when the welding helmet 140 is within communication range of the sensor device 134. In one embodiment, the location of the sensor device 134 is pre-stored within a memory of the sensor device 134. The sensor device 134 is also configured to transmit (e.g., via wireless transmission to the computer network 170) the identity of the welding helmet 140 and the location of the sensor device 134, as the location of the welding helmet 140, to be received by the server computers 112/114 via the networked system 100.

In accordance with one embodiment, the identity of the welding helmet 140 is associated with an identity of the operator assigned to the welding helmet 140 within the server computers 112/114. In this manner, when the server computers 112/114 receive the identity of the welding helmet 140, the identity of the assigned operator can be ascertained. The identities of the welding helmets and the associated assigned operators may be stored in a memory of the server computers 112/114, for example, as a table or a database data structure. Other ways of associating welding helmets to assigned operators within the server computers 112/114 are possible as well, in accordance with other embodiments.

In accordance with another embodiment, the welding helmet 140 includes a code reading device 148 configured to read a code on a badge 149 worn by the operator. The code identifies the operator and the code reading device 148 is configured to provide the code to the communication device 144. The communication device 144 is configured to transmit (e.g., via wireless transmission to the computer network 170) the code as an operator identifier to the server computers 112/114 via the networked system 100 (e.g., along with the identity, location, and triggering status of the welding helmet 140 worn by the operator). In accordance with various embodiments, the code reading device 148 may be, for example, an optical-based code reading device (e.g., a camera), a thermal-based code reading device (e.g., an infrared scanner), a magnetic code reading device (e.g., a magnetic card reader), or a laser-based code reading device (e.g., a laser scanner). Other types of code reading devices are possible as well, in accordance with other embodiments.

Embodiments of the other welding power sources 150 may be configured similarly to embodiments of the welding power source 130. Also, embodiments of the other welding helmets 160 may be configured similarly to embodiments of the welding helmet 140. Various welding power sources of the other welding power sources 150 may or may not have a co-located sensor device 134, in accordance with various embodiments. Also, various operators wearing the various other welding helmets 160 may or may not be wearing a badge 149 with an operator-identifying code, in accordance with various embodiments.

The data (e.g., digital data) from the welding helmet 140 and/or the sensor device 134 (or from the other welding helmets 160 or sensor devices) to the server computers 112 and/or 114 may be considered to be "first data". Therefore, the first data may represent an identity and/or a location of a welding helmet(s), an identity of the operator(s) wearing the welding helmet(s), as well as a triggering status indicating a triggering of an auto-darkening filter of the welding helmet(s) due to initiation of a welding arc. The data (e.g., digital data) from the welding power source 130 (or from the other welding power sources 150) to the server computers 112 and/or 114 may be considered to be "second data". Therefore, the second data represents an identity and/or a location of a welding power source(s) as well as an activation of the welding power source(s) to initiate a welding arc. The second data may also include representations of a welding voltage, a welding current, a welding mode, and/or a wire feed speed associated with the welding power source(s), for example. The second data may be stored within a memory of the welding power source(s), in accordance with one embodiment, which is accessible by the communication device 132.

The server computers 112 and/or 114 in the cloud environment 110, having received the first data and the second data from the welding environment 120 (e.g., over the internet), are configured to (i.e., include logic/intelligence to) correlate or match a welding power source to a human operator based on the first data and the second data. Such matching indicates that a particular welding power source is being operated by a particular operator wearing a particular welding helmet during a welding operation within the welding environment.

In this manner, any welding power source can be matched to any human operator using the welding power source in the welding environment. That is, a welding environment having multiple welding power sources and multiple human operators each wearing a welding helmet can report to the cloud environment 110 and the cloud environment can discern which welding power sources are being used by which operators. In one embodiment, the cloud environment records and tracks all associated information for quality and scheduling purposes. No human intervention is used to make any matches, associations, or correlations.

The various portions of the first data (identity, location, operator, triggering status) may be time stamped, in accordance with one embodiment. Similarly, the various portions of the second data (identity, location, activation status, welding voltage, welding current, welding mode, wire feed speed) may be time stamped, in accordance with one embodiment. The time stamps help the server computers with the matching process. For example, if the first data indicates that an auto-darkening filter 143 of a welding helmet 140 was triggered at a first time, and the second data indicates that a welding power source 130 was activated to initiate an arc at a second time which is within a few milliseconds of the first time, then it is likely that the welding power source 130 is being used by an operator wearing that welding helmet 140.

By knowing which welding power sources are being used by which operators wearing which particular welding helmets within the welding environment, various operational statistics can be tracked by the server computers and various decisions can be made with respect to managing the welding environment. For example, in one embodiment, the server computers are able to determine which operators are using which welding power sources at the present time, and which welding power sources are free to be used by other operators. Using such information, a manager of the welding environment (or of the server computers themselves) can schedule operators to various welding power sources at various times throughout the welding environment. Other estimations, determinations, and decisions can also be made based on knowing which welding power sources are matched to which operators within a welding environment, in accordance with various embodiments.

In accordance with one embodiment, the information matching the welding power sources to the human operators is communicated to a mobile device of a manager, where the mobile device of the manager is located within the welding environment 120 or is located remotely from the welding environment 120 (e.g., at a manager's home). In one embodiment, the information matching the welding power source 130 to the human operator is communicated over the networked system 100 to the welding power source 130. In this manner, the welding power source 130 can be configured to select pre-stored operator preferences based on the identification of the human operator.

Figure 2:
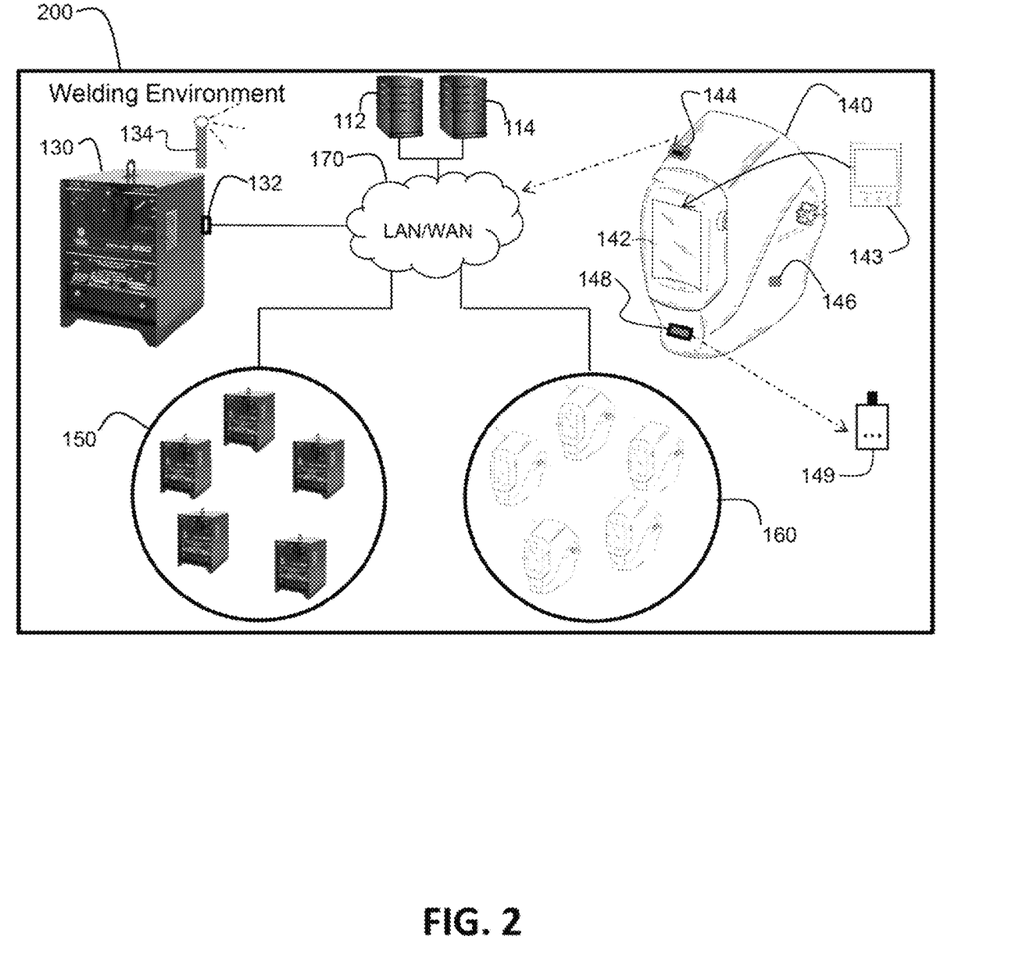
FIG. 2 illustrates a second embodiment of a networked system including a welding environment having multiple welding helmets and welding power sources.

FIG. 2 illustrates a second embodiment of a networked system 200 including a welding environment having welding helmets and welding power sources. The networked system 200 of FIG. 2 is similar to the networked system 100 of FIG. 1 except that the networked system 200 is entirely within the welding environment. The server computers 112 and 114 are no longer in a cloud environment but, instead, are part of the welding environment. Such a networked system 200 may be desirable, for example, when the cost associated with paying for resources in a cloud environment are too high over time, or when internet access is unavailable or unreliable. However, the functionality of collecting data and matching welding power sources to human operators may be essentially the same for both the networked system 100 of FIG. 1 and the networked system 200 of FIG. 2. Furthermore, even though the term "server computer" is used herein, with respect to FIG. 2, other types of equivalent computers (which are not technically server computers) may be used instead to perform the associated functions described herein, in accordance with various other embodiments.

Figure 3:
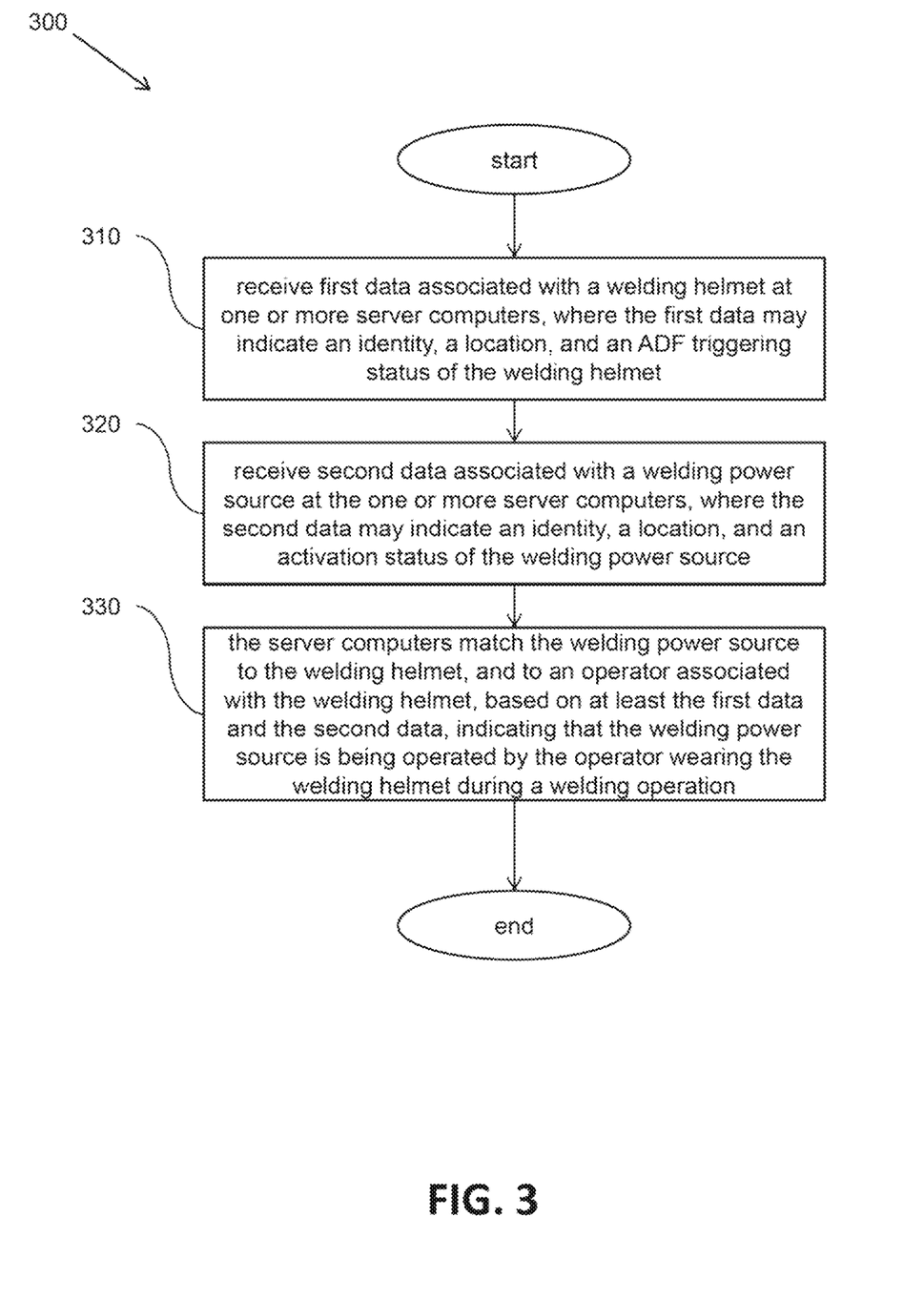
FIG. 3 illustrates a flowchart of an embodiment of a method of relating an operator to a welding power source in a welding environment.

FIG. 3 illustrates a flowchart of an embodiment of a method 300 of relating an operator to a welding power source in a welding environment. At block 310, one or more server computers receive first data associated with a welding helmet in the welding environment. The first data may indicate an identity, a location, an operator, and a triggering status of an auto-darkening filter of the welding helmet. In one embodiment, the triggering status indicates that the auto-darkening filter has been switched to a "dark" state due to initiation of a welding arc within the welding environment.

At block 320, the one or more server computers receive second data associated with a welding power source. The second data may indicate an identity, a location, and an activation status of the welding power source. The activation status indicates an activation of the welding power source to initiate a welding arc within the welding environment. At block 330, the server computers match the welding power source to the welding helmet (and to an operator associated with the welding helmet) based on at least the first data and the second data. The match indicates that the welding power source is being operated by the operator wearing the welding helmet during a welding operation within the welding environment. The method 300 may be performed by one or more of the server computers in the cloud environment of FIG. 1 or in the welding environment of FIG. 2, for example.

FIG. 4 illustrates an embodiment of an example server computer 400 that may be used as the server computer 112 and/or 114 in the networked system 100 of FIG. 1, or in the networked system 200 of FIG. 2. The server computer 400 includes at least one processor 414 which communicates with a number of peripheral devices via bus subsystem 412. These peripheral devices may include a storage subsystem 424, including, for example, a memory subsystem 428 and a file storage subsystem 426, user interface input devices 422, user interface output devices 420, and a network interface subsystem 416. The input and output devices allow user interaction with the server computer 400. Network interface subsystem 416 provides an interface to outside networks and is coupled to corresponding interface devices in other computer systems. For example, the welding power source 130 of the networked system 100 may share one or more characteristics with the server computer 400 and may include, for example, elements of a conventional computer, a digital signal processor, and/or other computing device.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the server computer 400 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the server computer 400 to the user or to another machine or computer system.

Storage subsystem 424 stores programming and data constructs that provide some or all of the server computer functionality described herein. For example, the storage subsystem 424 may include one or more software modules including computer executable instructions for matching a welding power source to a human operator.

These software modules are generally executed by processor 414 alone or in combination with other processors. Memory subsystem 428 used in the storage subsystem can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 426 in the storage subsystem 424, or in other machines accessible by the processor(s) 414.

Bus subsystem 412 provides a mechanism for letting the various components and subsystems of the server computer 400 communicate with each other as intended. Although bus subsystem 412 is shown schematically as a single bus, alternative embodiments of the bus subsystem may use multiple buses.

The server computer 400 can be of various implementations including a single conventional server computer, a single workstation, a part of a computing cluster, a blade server, a part of a server farm, or any other data processing system or computing device configured to perform the server computer functions described herein. Due to the ever-changing nature of computing devices and networks, the description of the server computer 400 depicted in FIG. 4 is intended only as a specific example for purposes of illustrating some embodiments. Many other configurations of the server computer 400 are possible having more or fewer components than the server computer depicted in FIG. 4.

Non-Server Embodiments

In accordance with other embodiments, a welding power source wirelessly communicates with welding helmets within the vicinity of the welding power source within a welding environment, without the use of server computers. As described previously herein, each of the welding helmets have first data associated with a respective welding helmet. The first data includes identities and/or locations of the welding helmets within the welding environment, and triggering statuses indicating the triggering of arc detection sensors (e.g., auto-darkening filters) associated with the welding helmets due to initiation of a welding arc within the welding environment. The first data is wirelessly transmitted to the welding power source in a direct manner, instead of to server computers via a network. Therefore the power source, effectively, directly monitors welding helmets that are in close proximity to the welding power source.

As described previously herein, the welding power source has second data which includes an identity and/or a location of the welding power source within the welding environment along with an activation status indicating an activation of the welding power source to initiate a welding arc within the welding environment. The welding power source is configured to match the welding power source to one of the welding helmets, and to an operator associated with the matched welding helmet, based on at least the first data and the second data. The matching indicates that the welding power source is being operated by the operator wearing the matched welding helmet during a welding operation within the welding environment. Helmet/operator information is recorded, along with welding data, within the welding power source, in accordance with one embodiment.

Figure 5:
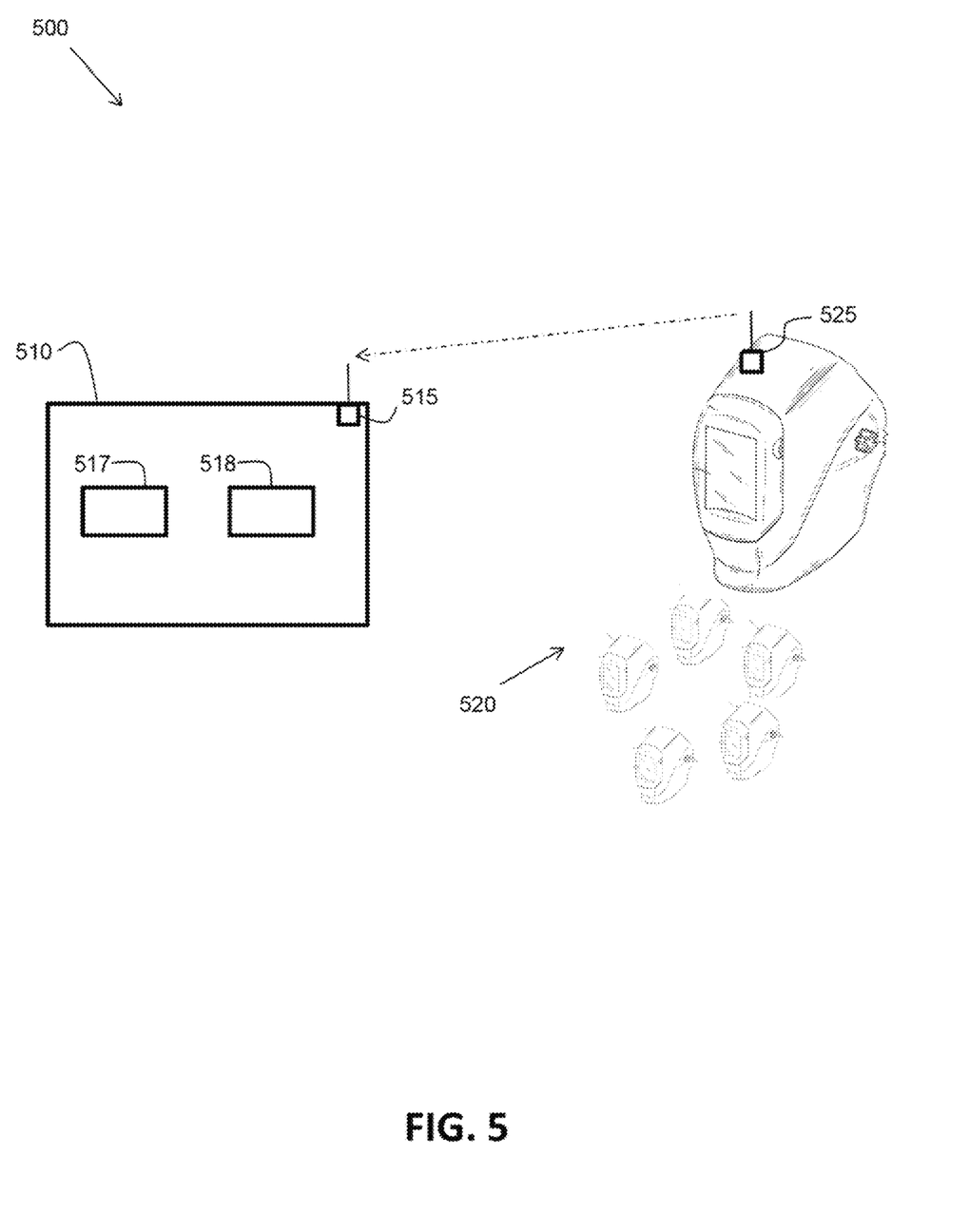
FIG. 5 illustrates one embodiment of a welding environment having a welding power source and a plurality of welding helmets in close proximity to the welding power source.

FIG. 5 illustrates one embodiment of a welding environment 500 having a welding power source 510 (e.g., similar to the welding power source 130 of FIG. 1) and a plurality of welding helmets 520 (e.g., similar to the welding helmets 140 and 160 of FIG. 1) in close proximity to the welding power source 510. The welding helmets 520 each include a wireless transmitter 525 configured to wirelessly communicate the first data to the welding power source 510. Furthermore, the welding power source 510 includes a wireless receiver 515 configured to wirelessly receive the first data from the various welding helmets 520. The welding power source 510 also includes a processor 517 and a memory 518 configured to analyze the first data and the second data to match (e.g., as previously described herein) a welding helmet (and operator) to the welding power source and store the results. In this manner, a welding helmet and associated operator can be matched to a welding power source without the use of server computers.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A method of relating an operator to a welding power source in a welding environment, the method comprising:
    receiving first data associated with a welding helmet within a welding environment at one or more server computers in a networked system, wherein the first data indicates:
        at least one of an identity or a location of the welding helmet within the welding environment, and
        a triggering status indicating a triggering of an arc detection sensor associated with the welding helmet due to initiation of a welding arc within the welding environment;
    receiving second data associated with a welding power source within the welding environment at the one or more server computers in the networked system, wherein the second data indicates:
        at least one of an identity or a location of the welding power source within the welding environment, and
        an activation status indicating an activation of the welding power source to initiate the welding arc within the welding environment;
    the one or more server computers in the networked system matching the welding power source to the welding helmet, and to an operator associated with the welding helmet, based on at least the first data and the second data; and
    selecting pre-stored operator preferences for the welding power source based on the matching.

2. The method of claim 1, further comprising configuring the networked system as at least one of a local area network (LAN), a wide area network (WAN), or a cloud-based network.

3. The method of claim 1, further comprising associating the welding helmet, within the one or more server computers, as being assigned to the operator.

4. The method of claim 1, further comprising wirelessly transmitting the first data from the welding helmet via a communication device of the welding helmet to be received by the one or more server computers via the networked system.

5. The method of claim 1, further comprising transmitting the second data from the welding power source via a communication device of the welding power source to be received by the one or more server computers via the networked system.

6. The method of claim 1, further comprising receiving the location and the identity of the welding helmet at the one or more server computers, as part of the first data, from a sensor device co-located with the welding power source, wherein the sensor device is configured to sense at least the identity of the welding helmet when the welding helmet is within communication range of the sensor device.

7. The method of claim 1, further comprising reading an RFID tag of the welding helmet, via an RFID reader co-located with the welding power source, to extract at least the identity of the welding helmet.

8. The method of claim 1, further comprising the welding helmet reading a code on a badge worn by the operator, wherein the code identifies the operator.

9. The method of claim 8, further comprising receiving the code at the one or more server computers in the networked system as part of the first data after the code is read by the welding helmet.

10. The method of claim 8, wherein the welding helmet reads the code via a code reading device of the welding helmet.

11. A networked system for relating an operator to a welding power source in a welding environment, the networked system comprising:
    a plurality of welding power sources within the welding environment;
    a plurality of welding helmets within the welding environment; and
    at least one server computer configured to:
        receive first data associated with a welding helmet of the plurality of welding helmets within the welding environment, wherein the first data indicates:
            at least one of an identity or a location of the welding helmet within the welding environment, and
            a triggering status indicating a triggering of an arc detection sensor associated with the welding helmet due to initiation of a welding arc within the welding environment,
        receive second data associated with a welding power source of the plurality of welding power sources within the welding environment, wherein the second data indicates:
            at least one of an identity or a location of the welding power source within the welding environment, and
            an activation status indicating an activation of the welding power source to initiate the welding arc within the welding environment, and
        match the welding power source to the welding helmet, and to an operator associated with the welding helmet, based on at least the first data and the second data, indicating that the welding power source is being operated by the operator wearing the welding helmet during a welding operation within the welding environment, wherein the triggering status of the first data and the activation status of the second data are time stamped to help in determining the match of the welding power source to the welding helmet and the operator.

12. The networked system of claim 11, wherein the networked system is configured as at least one of a local area network (LAN), a wide area network (WAN), or a cloud-based network.

13. The networked system of claim 11, wherein the at least one server computer is configured to store association data that associates the welding helmet as being assigned to the operator.

14. The networked system of claim 11, wherein the at least one server computer is configured to access association data that associates the welding helmet as being assigned to the operator.

15. The networked system of claim 11, wherein the welding power source includes a communication device configured to transmit the second data from the welding power source to be received by the at least one server computer via the networked system.

16. The networked system of claim 11, further comprising a sensor device co-located with the welding power source, wherein the sensor device is configured to:
sense at least the identity of the welding helmet when the welding helmet is within communication range of the sensor device; and
transmit at least the identity of the welding helmet and the location of the sensor device, as the location of the welding helmet, to be received by the at least one server computer via the networked system.

17. The networked system of claim 16, wherein the welding helmet includes an RFID tag storing at least the identity of the welding helmet, and wherein the sensor device is configured to read at least the identity of the welding helmet from the RFID tag when the welding helmet is within communication range of the welding power source.

18. The networked system of claim 11, wherein the welding helmet includes a communication device configured to wirelessly transmit the first data from the welding helmet to be received by the at least one server computer via the networked system.

19. The networked system of claim 18, wherein the welding helmet includes a code reading device configured to read a code on a badge worn by the operator, wherein the code identifies the operator, and wherein the code reading device is configured to provide the code to the communication device to be transmitted to the at least one server computer via the networked system as part of the first data.

20. The networked system of claim 18, wherein the arc detection sensor includes an auto-darkening filter of the welding helmet and is configured to provide the triggering status to the communication device to be transmitted to the at least one server computer via the networked system as part of the first data.

* * * * *